United States Patent
Åström et al.

(10) Patent No.: US 10,652,856 B2
(45) Date of Patent: May 12, 2020

(54) TRANSMISSION AND RECEPTION OF BROADCAST INFORMATION IN A WIRELESS COMMUNICATION SYSTEM

(71) Applicant: Telefonaktiebolaget LM Ericsson (publ), Stockholm (SE)

(72) Inventors: Magnus Åström, Lund (SE); Robert Baldemair, Solna (SE); Pål Frenger, Linköping (SE); Fredrik Ovesjö, Älvsjö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/007,271

(22) Filed: Jun. 13, 2018

(65) Prior Publication Data

US 2018/0376454 A1 Dec. 27, 2018

Related U.S. Application Data

(60) Provisional application No. 62/523,471, filed on Jun. 22, 2017.

(51) Int. Cl.
*H04L 27/26* (2006.01)
*H04L 5/00* (2006.01)
(Continued)

(52) U.S. Cl.
CPC ........ *H04W 72/005* (2013.01); *H04B 7/0617* (2013.01); *H04L 5/0048* (2013.01);
(Continued)

(58) Field of Classification Search
CPC ............ H04W 72/005; H04W 72/0446; H04L 5/0005; H04L 5/0053; H04L 27/2602
See application file for complete search history.

(56) References Cited

U.S. PATENT DOCUMENTS

2017/0353254 A1* 12/2017 Islam .................. H01Q 3/2605
2017/0353257 A1* 12/2017 Islam .................. H04J 3/0617
(Continued)

OTHER PUBLICATIONS

Ericsson, "R2-1700477: Acquisition of Minimum SI" 3GPP TSG-RAN WG NR Ad Hoc, Spokane, USA, Jan. 17-19, 2017 (Year: 2017).*

(Continued)

*Primary Examiner* — Gary Mui
(74) *Attorney, Agent, or Firm* — Withrow & Terranova, PLLC

(57) ABSTRACT

Systems and methods for transmitting and receiving other broadcast information, OBI, are disclosed. In some embodiments, a method of operation of wireless communication device for a wireless communication system comprises receiving and decoding a transmission unit in which OBI is collocated with at least a portion of a Synchronization Signal Block (SSB). The SSB comprises a primary synchronization signal (PSS), a secondary synchronization signal (SSS), and a physical broadcast channel (PBCH). The OBI comprises paging messages, remaining minimum system information (RMSI), and/or random access response (RAR) messages. In some embodiments, the transmission unit is a transmission unit having a duration that is two or more symbols but less than a duration of a full slot. In this manner, resources of the wireless communication system are efficiently utilized, which results in higher link and system capacity as well as lower network power consumption from increased stand-by times.

40 Claims, 12 Drawing Sheets

(51) Int. Cl.
*H04W 72/00* (2009.01)
*H04W 72/04* (2009.01)
*H04B 7/06* (2006.01)
*H04W 68/00* (2009.01)
*H04W 56/00* (2009.01)

(52) U.S. Cl.
CPC ........ *H04L 5/0053* (2013.01); *H04L 27/2602* (2013.01); *H04W 72/0446* (2013.01); *H04L 5/0007* (2013.01); *H04L 5/0023* (2013.01); *H04L 27/2613* (2013.01); *H04L 27/2692* (2013.01); *H04W 56/001* (2013.01); *H04W 68/005* (2013.01)

(56) References Cited

U.S. PATENT DOCUMENTS

| | | | | |
|---|---|---|---|---|
| 2018/0110019 | A1* | 4/2018 | Ly | H04W 56/001 |
| 2018/0192383 | A1* | 7/2018 | Nam | H04W 56/001 |
| 2018/0205585 | A1* | 7/2018 | Sadiq | H04L 5/0023 |
| 2018/0278356 | A1* | 9/2018 | Zhou | H04L 5/005 |
| 2018/0324720 | A1* | 11/2018 | Ly | H04W 56/001 |
| 2018/0324753 | A1* | 11/2018 | Islam | H04W 48/12 |
| 2018/0324843 | A1* | 11/2018 | Lee | H04W 72/1289 |
| 2018/0331875 | A1* | 11/2018 | Abedini | H04W 68/005 |
| 2018/0337755 | A1* | 11/2018 | John Wilson | H04L 27/2675 |
| 2018/0337757 | A1* | 11/2018 | Noh | H04L 27/2611 |
| 2018/0343156 | A1* | 11/2018 | Malik | H04J 11/0073 |
| 2018/0359715 | A1* | 12/2018 | Abedini | H04W 56/0005 |
| 2018/0368145 | A1* | 12/2018 | Abdoli | H04L 5/00 |
| 2019/0007152 | A1* | 1/2019 | Yi | H04L 5/0007 |
| 2019/0149383 | A1* | 5/2019 | Ko | H04W 72/0453 370/329 |
| 2019/0150110 | A1* | 5/2019 | Ko | H04J 11/00 |

OTHER PUBLICATIONS

ZTE, ZTE Microelectronics, "R1-1701579: Paging in NR" 3GPP TSG RAN WG1 Meeting #88, Athens, Greece, Feb. 13-17, 2017 (Year: 2017).*

Huawei, HiSilicon, "R1-1703353: Discussion on SS burst set compoisiton and SS blick time index indication" 3GPP TSG RAN WG1 Meeting #88, Athens, Greece, Feb. 13-17, 2017 (Year: 2017).*

MediaTek Inc., "R1-1704439: Consideration on Paging design and transmission" 3GPP TSG RAN WG1 Meeting #88, Spokan, USA, Apr. 3-7, 2017 (Year: 2017).*

Nokia, Alcatel-Lucent Shanghai Bell, "R1-1705841: On Remaining System Information Delivery", 3GPP TSG RAN WG1 Meeting #88, Spokan, USA, Apr. 3-7, 2017 (Year: 2017).*

LG Electronics, "R1-1707588: Discussion on SS block composition and SS burst set composition" 3GPP TSG RAN WG1 Meeting #89, Hangzhou, P.R. China May 15-19, 2017 (Year: 2017).*

Author Unknown, "Technical Specification Group Radio Access Network; NR; Physical channels and modulation (Release 15)," Technical Specification 38.211, Version 0.0.1, 3GPP Organizational Partners, Jun. 2017, 21 pages.

MEDIATEK Inc., "R1-1710801: Further discussion on remaining minimum system information delivery," Third Generation Partnership Project (3GPP) TSG RAN WG1 Meeting Ad-Hoc#2, Jun. 27-30, 2017, Qingdao, P.R. China, 2 pages.

ZTE, "R1-1709891: RMSI delivery," Third Generation Partnership Project (3GPP) TSG RAN WG1 NR Ad-Hoc#2, Jun. 27-30, 2017, Qingdao, P.R. China, 7 pages.

International Search Report and Written Opinion for International Patent Application No. PCT/EP2018/066380, dated Sep. 13, 2018, 18 pages.

Ericsson, "R1-1611903: Broadcasting system information by means of SFN-transmission in NR," Third Generation Partnership Project (3GPP) TSG-RAN WG1 Meeting #87, Nov. 14-18, 2016, Reno, Nevada, USA, 3 pages.

Ericsson, "R2-1701563: Further analysis of NR minimum SI at network sharing," Third Generation Partnership Project (3GPP) TSG-RAN WG2 #97, Feb. 13-17, 2017, Athens, Greece, 4 pages.

Ericsson, "R1-1706869: LS on Mixed numerologies in idle mode," Third Generation Partnership Project (3GPP) TSG RAN WG1 Meeting #89, May 15-19, 2017, Spokane, Washington, USA, 1 page.

Ericsson, "R1-1711374: NR-PBCH Content and payload size," Third Generation Partnership Project (3GPP) TSG RAN WG1 NR Ad-Hoc#2, Jun. 27-30, 2017, Qingdao, P.R. China, 5 pages.

Ericsson, "R1-1711378: NR delivery of other system information," Third Generation Partnership Project (3GPP) TSG RAN WG1 NR Ad-Hoc#2, Jun. 27-30, 2017, Qingdao, P.R. China, 3 pages.

Ericsson, "R1-1711377: NR delivery of remaining minimum system information," Third Generation Partnership Project (3GPP) TSG RAN WG1 NR Ad-Hoc#2, Jun. 27-30, 2017, Qingdao, P.R. China, 5 pages.

* cited by examiner

TRANSMISSION AND RECEPTION OF BROADCAST INFORMATION IN A WIRELESS COMMUNICATION SYSTEM

RELATED APPLICATIONS

This application claims the benefit of provisional patent application Ser. No. 62/523,471, filed Jun. 22, 2017, the disclosure of which is hereby incorporated herein by reference in its entirety.

BACKGROUND

In order to connect to a network, a wireless communication device needs to acquire network synchronization and obtain essential System Information (SI). Synchronization signals are used for adjusting the frequency of the wireless communication device relative to the network, and for finding the proper timing of the received signal from the network. In Third Generation Partnership Project (3GPP) Fifth Generation (5G) New Radio (NR), the synchronization and access procedure may involve several signals:

Primary Synchronization Signal (PSS) allows for network detection in the presence of a high initial frequency error, up to tens of parts per million (ppm). Additionally, the PSS provides a network timing reference. 3GPP has selected m-sequences for PSS.

Secondary Synchronization Signal (SSS) allows for more accurate frequency adjustments and channel estimation while at the same time providing fundamental network information, e.g. cell Identifier (ID). Also, SSS is based on m-sequences.

Physical Broadcast Channel (PBCH) provides a subset of the minimum SI for random access. It will also provide timing information within a cell, e.g. to separate timing between beams transmitted from a cell. The amount of information to fit into the PBCH is highly limited to keep the size down. Furthermore, Demodulation Reference Signals (DMRSs) are interleaved with the PBCH in order for a receiver to receive and demodulate and decode it properly.

A Synchronization Signal (SS) Block (SSB) for 3GPP NR comprises the above signals (PSS, SSS, PBCH).

In NR, the PBCH transmission scheme is discussed in 3GPP and has the following proposed composition/structure as illustrated in FIG. 1. FIG. 1 illustrates NR-PSS, NR-SSS, and NR-PBCH in a SSB.

In FIG. 1, two Orthogonal Frequency Division Multiplexing (OFDM) symbols are reserved for NR-PBCH transmission. NR-PSS and NR-SSS are defined to be 127 subcarriers wide whereas the NR-PBCH is defined to be 288 subcarriers wide.

A number of (typically rather close in time) SSBs constitute an SS burst. A collection of SS bursts is an SS burst set. The SS burst set is repeated periodically, say, every 20 milliseconds (ms). It has been agreed in 3GPP that, for frequencies below 3 gigahertz (GHz), a maximum of 4 SSBs comprises a burst set, whereas the corresponding maximum is 8 and 64 for 3 to 6 GHz and above 6 GHz, respectively. By allowing multiple SSBs, it is possible to repeat SSB transmissions in different directions by changing the beamforming weights for different SSBs. An SS burst set is transmitted periodically, see FIG. 2 which illustrates a SS burst transmission, and the User Equipment device (UE) can, by using the SSBs in the SS burst set, determine the downlink timing and acquire some fundamental SI from the PBCH. It has been agreed in 3GPP that an NR UE in idle mode can expect an SS burst set transmitted from the network once per 20 ms (in connected mode the UE can be configured to expect SS burst sets once per 5 ms). Hence, once the UE has obtained downlink synchronization, it knows in which slots to expect SSB transmissions.

Looking at FIG. 2, there are SSBs, SS bursts comprising one or more SSBs, and an SSB set comprising one or more SS bursts. Each SSB is drawn in various shaded boxes in FIG. 2. Each different type of shading represents different beam directions in which the SSBs are transmitted. Each SSB with a corresponding beam direction is then repeated with, e.g., 20 ms periodicity. The non-filled boxes represent gaps. A gap in the beginning of a slot may be used for Physical Downlink Control Channel (PDCCH), and a gap at the end of a slot may be used for data or an Ultra-Reliable and Low Latency Communication (URLLC) uplink acknowledgement. The longer gap between SS bursts may be used for other transmissions in either the uplink or downlink.

The SSB (and hence the SS burst and burst set) only uses up to 288 subcarriers (127 for PSS and SSS) while an NR carrier may be significantly wider than that. To allow the bandwidth outside the 288 (or 127) subcarriers used for SSB transmission or symbols in a slot not used for SSB transmission for other data transmission, it is beneficial if the SS burst transmission avoids the first few OFDM symbols in a slot to create a gap to allow for PDCCH transmission.

Although the ambition in 3GPP NR has been to keep broadcast to a minimum, apart from the SSBs, some other channels exist that must be broadcast, i.e. transmitted from the network such that all devices in a cell may receive them, i.e., providing area coverage. 3GPP NR will include Remaining Minimum SI (RMSI) that must be read prior to attempting a random access procedure. Also, paging messages are broadcast in the sense that the network does not explicitly know the whereabouts of the receiver, necessitating a broadcast transmission over a limited geographical area.

RMSI:

RMSI is configured in NR-PDCCH and transmitted in NR Physical Downlink Shared Channel (PDSCH), a.k.a. RMSI.

Paging Signals:

Paging is used to inform UEs in idle or inactive state about the need to connect to the network, or to signal updated system information (SI) or emergency messages. In 3GPP Long Term Evolution (LTE), paging is delivered like any downlink data using the PDCCH and the PDSCH. The paging message, transmitted on the PDSCH, is allocated transmission resources by a scheduling assignment on the PDCCH addressed to the Paging Radio Network Temporary Identifier (P-RNTI) (which is shared by multiple UEs). The delivery channel is cell-specific, since both the reference signals and the scrambling are derived from the Physical Cell Identity (PCI).

It has been agreed in 3GPP that, in NR, the paging message is scheduled by Downlink Control Information (DCI) transmitted on an NR-PDCCH and the paging message is then transmitted on the associated NR-PDSCH. The same principle as in LTE, i.e. delivering paging on a physical channel where the information needed to demodulate the physical channel can be derived from the camping cell PCI, should be supported in NR, too.

The paging furthermore needs to support variable payload, at least since the UE IDs used for paging may be of variable size and paging of multiple UEs during one paging occasion needs to be supported to allow long network Discontinuous Transmission (DTX). It is estimated that the paging payload can be from 10-20 bits for paging a single UE up to several hundred information bits for paging multiple UEs or emergency message transmission, and hence the format needs to support at least such payload variations.

Since paging is typically performed over larger areas, Single-Frequency Network (SFN) transmission involving multiple cells or multiple transmission points serving the same cell is possible, with the benefit of improving the link budget. Hence, it is expected that NR paging will support SFN transmission and allow a common configuration for the Transmission and Reception Points (TRPs) that transmit paging. NR paging will therefore likely support two options for configuration of the information needed in order for the UE to demodulate the paging channel, e.g. DMRS and its scrambling phase: (1) based on camping cell PCI or (2) configurable by the NR base station (gNB) in order to support SFN transmission.

Paging in Beam-Swept Scenarios:

In low frequency bands, omnidirectional or wide beam transmission will typically be used for paging delivery. In higher frequencies, sweeping of narrow beams may be used for paging, similarly to SSB.

Beam sweeping approaches for paging delivery has the disadvantage of large overhead, especially if many UEs need to be paged. The number of repetitions needed to provide coverage at the cell edge depend on the deployment density and the applied modulation and coding. Since paging is typically performed over larger areas, SFN transmission involving multiple cells or multiple transmission points serving the same cell is possible. The SFN mechanism improves the link budget further and should, as mentioned above, also be supported by NR.

3GPP NR is expected to support at least three different delivery mechanisms for paging: (1) omnidirectional or wide beam (e.g., sector) transmission, (2) sweeping of narrow beams, and (3) SFN transmission involving multiple cells or multiple TRPs serving the same cell.

SUMMARY

Systems and methods for transmitting and receiving other broadcast information (OBI) are disclosed. In some embodiments, a method of operation of wireless communication device for a wireless communication system comprises receiving and decoding a transmission unit in which OBI is collocated with at least a portion of a Synchronization Signal Block (SSB). The SSB comprises a Primary Synchronization Signal (PSS), a Secondary Synchronization Signal (SSS), and a Physical Broadcast Channel (PBCH). The OBI comprises paging messages, Remaining Minimum System Information (RMSI), and/or Random Access Response (RAR) messages. In some embodiments, the transmission unit is a transmission unit having a duration that is two or more symbols but less than a duration of a full slot. In this manner, resources of the wireless communication system are efficiently utilized, which results in higher link and system capacity as well as lower network power consumption from increased stand-by times.

In some embodiments, the OBI is time-multiplexed with the at least a portion of the SSB. In some other embodiments, the OBI is frequency-multiplexed with the at least a portion of the SSB. In some other embodiments, the OBI is time and frequency multiplexed with the at least a portion of the SSB.

In some embodiments, in the time domain, at least a portion of the transmission unit overlaps at least a portion of a set of SSB time-frequency resources used for transmission of the SSB. Further, the transmission unit comprises a set of OBI time-frequency resources that are time division multiplexed with the at least a portion of the set of SSB time-frequency resources overlapped by the transmission unit, the set of OBI time-frequency resources being a set of time-frequency resources used for transmission of the OBI. In some other embodiments, in the time domain, at least a portion of the transmission unit overlaps at least a portion of a set of SSB time-frequency resources used for transmission of the SSB. Further, the transmission unit comprises a set of OBI time-frequency resources that are frequency division multiplexed with the at least a portion of the set of SSB time-frequency resources overlapped by the transmission unit, the set of OBI time-frequency resources being a set of time-frequency resources used for transmission of the OBI. In some other embodiments, in the time domain, at least a portion of the transmission unit overlaps at least a portion of a set of SSB time-frequency resources used for transmission of the SSB. Further, the transmission unit comprises a set of OBI time-frequency resources that are both time and frequency division multiplexed with the at least a portion of the set of SSB time-frequency resources overlapped by the transmission unit, the set of OBI time-frequency resources being a set of time-frequency resources used for transmission of the OBI. In some embodiments, the set of OBI time-frequency resources is a function of a location of the SSB.

In some embodiments, the SSB is one of a plurality of SSBs in a Synchronization Signal (SS) burst and/or burst set and at least some SSBs in the plurality of SSBs in the SS burst and/or burst set are transmitted with different beamforming. Further, in some embodiments, a duration of the transmission unit does not extend to a next SSB in the SS burst and/or burst set.

In some embodiments, the method further comprises repeating the steps of receiving and decoding for a plurality of SSBs across a plurality of SS bursts and/or burst sets, where different types of OBIs are transmitted in different SS bursts and/or burst sets.

In some embodiments, the method further comprises receiving information regarding a location of the OBI in the transmission unit.

In some embodiments, the transmission unit comprises a control channel comprising information indicative of a location of the OBI within the transmission unit.

In some embodiments, the method further comprises receiving information that indicates whether OBI is collocated with SSBs.

In some embodiments, the method further comprises receiving information about the OBI being frequency division multiplexed, time division multiplexed, or time and frequency multiplexed with the SSB.

In some embodiments, a duration of the transmission unit is longer than that of the SSB.

In some embodiments, the RMSI is System Information Block 1 (SIB1).

In some embodiments, the at least a portion of the set of SSB time-frequency resources are part of the transmission unit.

In some embodiments, the at least a portion of the set of SSB time-frequency resources are not part of the transmission unit.

Embodiments of a wireless device are also disclosed. In some embodiments, a wireless communication device for a wireless communication system is adapted to receive and decode a transmission unit in which OBI is collocated with at least a portion of an SSB. The SSB comprises a PSS, an SSS, and a PBCH. The OBI comprises paging messages, RMSI, and/or RAR messages. In some embodiments, the transmission unit is a transmission unit having a duration that is two or more symbols but less than a duration of a full slot.

In some embodiments, a wireless communication device for a wireless communication system comprises one or more receivers and circuitry operable to, together with the one or more receivers, receive and decode a transmission unit in which OBI is collocated with at least a portion of an SSB. The SSB comprises a PSS, an SSS, and a PBCH. The OBI comprises paging messages, RMSI, and/or RAR messages. In some embodiments, the transmission unit is a transmission unit having a duration that is two or more symbols but less than a duration of a full slot.

Embodiments of a method of operation of a network node in a wireless communication system are also disclosed. In some embodiments, a method of operation of a network node in a wireless communication system comprises allocating a transmission unit where, in the time domain, at least a portion of the transmission unit overlaps at least a portion of a set of SSB time-frequency resources to be used for transmission of an SSB. The method further comprises assigning OBI to time-frequency resources in the transmission unit, and transmitting, or causing transmission of, the transmission unit comprising the OBI. The SSB comprises a PSS, an SSS, and a PBCH. The OBI comprises paging messages, RMSI, and/or RAR messages. In some embodiments, the transmission unit is a transmission unit having a duration that is two or more symbols but less than a duration of a full slot.

In some embodiments, the SSB is one of a plurality of SSBs in an SS burst and/or burst set, at least some SSBs in the plurality of SSBs in the SS burst and/or burst set are transmitted with different beamforming, and transmitting, or causing transmission of, the transmission unit comprises transmitting, or causing transmission of, the transmission unit utilizing the beamforming for the SSB in the SS burst and/or burst set. Further, in some embodiments, allocating the transmission unit comprises allocating the transmission unit such that a duration of the transmission unit does not extend to a next SSB in the SS burst and/or burst set.

In some embodiments, allocating the transmission unit comprises allocating the transmission unit such that the transmission unit comprises a set of OBI time-frequency resources that are frequency division multiplexed with the at least a portion of the set of SSB time-frequency resources overlapped by the transmission unit, and assigning the OBI to the time-frequency resources in the transmission unit other than those in the set of SSB time-frequency resources comprises assigning the OBI to the set of OBI time-frequency resources.

In some embodiments, allocating the transmission unit comprises allocating the transmission unit such that the transmission unit comprises a set of OBI time-frequency resources that are time division multiplexed with the at least a portion of the set of SSB time-frequency resources overlapped by the transmission unit, and assigning the OBI to the time-frequency resources in the transmission unit other than those in the set of SSB time-frequency resources comprises assigning the OBI to the set of OBI time-frequency resources.

In some embodiments, allocating the transmission unit comprises allocating the transmission unit such that the transmission unit comprises a set of OBI time-frequency resources that are time and frequency division multiplexed with the at least a portion of the set of SSB time-frequency resources overlapped by the transmission unit, and assigning the OBI to the time-frequency resources in the transmission unit other than those in the set of SSB time-frequency resources comprises assigning the OBI to the set of OBI time-frequency resources.

In some embodiments, the set of OBI time-frequency resources is a function of a location of the SSB.

In some embodiments, the method further comprises repeating the steps of allocating, assigning, and transmitting, or causing transmission, for a plurality of SSBs.

In some embodiments, the method further comprises repeating the steps of allocating, assigning, and transmitting, or causing transmission, for a plurality of SSBs across a plurality of SS bursts and/or burst sets, where different types of OBI are transmitted in different SS bursts and/or burst sets.

In some embodiments, the transmission unit comprises a control channel comprising information indicative of a location of the OBI within the transmission unit.

In some embodiments, the method further comprises transmitting information that indicates whether OBI is collocated with SSBs.

In some embodiments, the method further comprises transmitting information about the OBI being frequency division multiplexed, time division multiplexed, or time and frequency multiplexed with the SSB.

In some embodiments, a duration of the transmission unit is longer than that of the SSB.

In some embodiments, allocating the transmission unit comprises allocating the transmission unit such that a duration of the transmission unit is a function of an amount of OBI to be transmitted in the transmission unit and an available bandwidth to be used by the transmission unit.

In some embodiments, the RMSI is SIB1.

In some embodiments, the at least a portion of the set of SSB time-frequency resources are part of the transmission unit, and assigning the OBI to time-frequency resources in the transmission unit comprises assigning the OBI to time-frequency resources in the transmission unit different from those in the at least a portion of the set of SSB time-frequency resources that are part of the transmission unit.

In some embodiments, the at least a portion of the set of SSB time-frequency resources are not part of the transmission unit, and assigning the OBI to time-frequency resources in the transmission unit comprises assigning the OBI to time-frequency resources in the transmission unit that are overlapped, in time and/or frequency, by the at least a portion of the set of SSB time-frequency resources.

Embodiments of a network node are also disclosed. In some embodiments, a network node for a wireless communication system is adapted to allocate a transmission unit where, in the time domain, at least a portion of the transmission unit overlaps at least a portion of a set of SSB time-frequency resources to be used for transmission of an SSB. The network node is further adapted to assign OBI to time-frequency resources in the transmission unit, and to transmit the transmission unit comprising the OBI or to cause transmission of the transmission unit comprising the OBI by a remote radio unit(s). The SSB comprises a PSS, an SSS, and a PBCH. The OBI comprises paging messages, RMSI, and/or RAR messages. In some embodiments, the transmission unit is a transmission unit having a duration that is two or more symbols but less than a duration of a full slot.

In some embodiments, a network node for a wireless communication system comprises circuitry operable to allocate a transmission unit where, in the time domain, at least a portion of the transmission unit overlaps at least a portion of a set of SSB time-frequency resources to be used for transmission of an SSB, assign OBI to time-frequency resources in the transmission unit, and transmit the transmission unit comprising the OBI or cause transmission of the transmission unit comprising the OBI by a remote radio unit(s). The SSB comprises a PSS, an SSS, and a PBCH. The OBI comprises paging messages, RMSI, and/or RAR messages. In some embodiments, the transmission unit is a transmission unit having a duration that is two or more symbols but less than a duration of a full slot.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
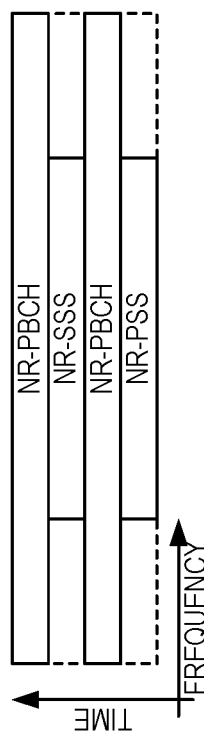
FIG. 1 illustrates a proposed structure of the physical broadcast transmission scheme in New Radio (NR)
Figure 2:
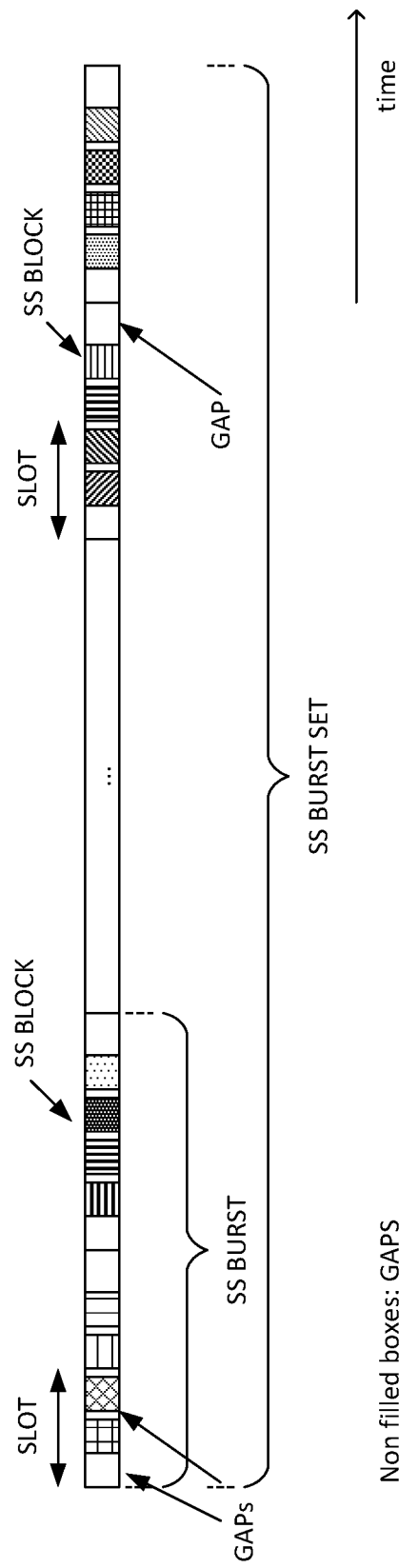
FIG. 2 illustrates periodic transmission of a Synchronization Signal (SS) burst set.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network (i.e., a wireless communications network) that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), an access node or point, and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

It has been agreed in 3GPP that a maximum of 4, 8, or 64 Synchronization Signal Blocks (SSBs) will be used for frequencies below 3 Gigahertz (GHz), between 3 and 6 GHz, and above 6 GHz, respectively. These will require up to 5 millisecond (ms) of the 20 ms Synchronization Signal (SS) burst set, during which time the transmitter may be limited in its ability to transmit data. In particular, this is true for analog beamforming or for wide beam beamforming since both of these cases may prevent data from being transmitted in other directions. Adding Remaining Minimum System Information (RMSI) and paging to the SS overhead will result in even less available resources for data transmissions. Hence, there is a need for an efficient collocation of Other Broadcast Information (OBI), e.g., paging and RMSI, with the SSB, in order to minimize the signaling overhead in NR broadcast.

Systems and methods are disclosed herein for allocating OBI (e.g., RMSI and/or paging and/or Random Access Response (RAR)) such that the OBI is collocated with transmissions of SSBs. Systems and methods are also disclosed herein for receiving OBI that is collocated with transmissions of SSBs at a wireless communication device. As used herein, "OBI" means information, other than that included in the SSB, that is broadcast by the network.

Specifically, the OBI includes RMSI, paging messages, and/or RARs. RAR is not a broadcast per se, but effectively it might need to be broadcast since the radio access node (e.g., gNB) may not know where to transmit the RAR; hence, it might be treated as a broadcast in this perspective. As an advantageous consequence of collocating the OBI with transmissions of SSBs, as disclosed herein, resources are better utilized resulting in higher link and system capacity. The reason for this is that SSBs are beamformed and that, with analog beamforming, the Resource Elements (REs) in the SSB symbols are difficult to use for other signals since these REs will need to be sent with same beamforming as the SSB. However, broadcast signals (i.e., the OBI) are a perfect match since they will also need to be beam swept.

Note that, at least in some cases, the radio access node (e.g., gNB) can determine the wireless communication device's location and send the RAR in the direction of the wireless communication device. However, even in those cases, it may still be beneficial to collocate the RAR with an SSB even if the RAR is not beam swept. For example, the wireless communication device may find a strongest SSB and send Physical Random Access Channel (PRACH) in time-frequency resources associated with the strongest SSB. During these time-frequency resources, the radio access node (e.g., gNB) uses a PRACH receiver beam that coincides with the strongest SSB beam. The radio access node sends back a RAR to the wireless communication device by frequency multiplexing the RAR with the SSB that corresponds to the strongest SSB.

Figure 3:
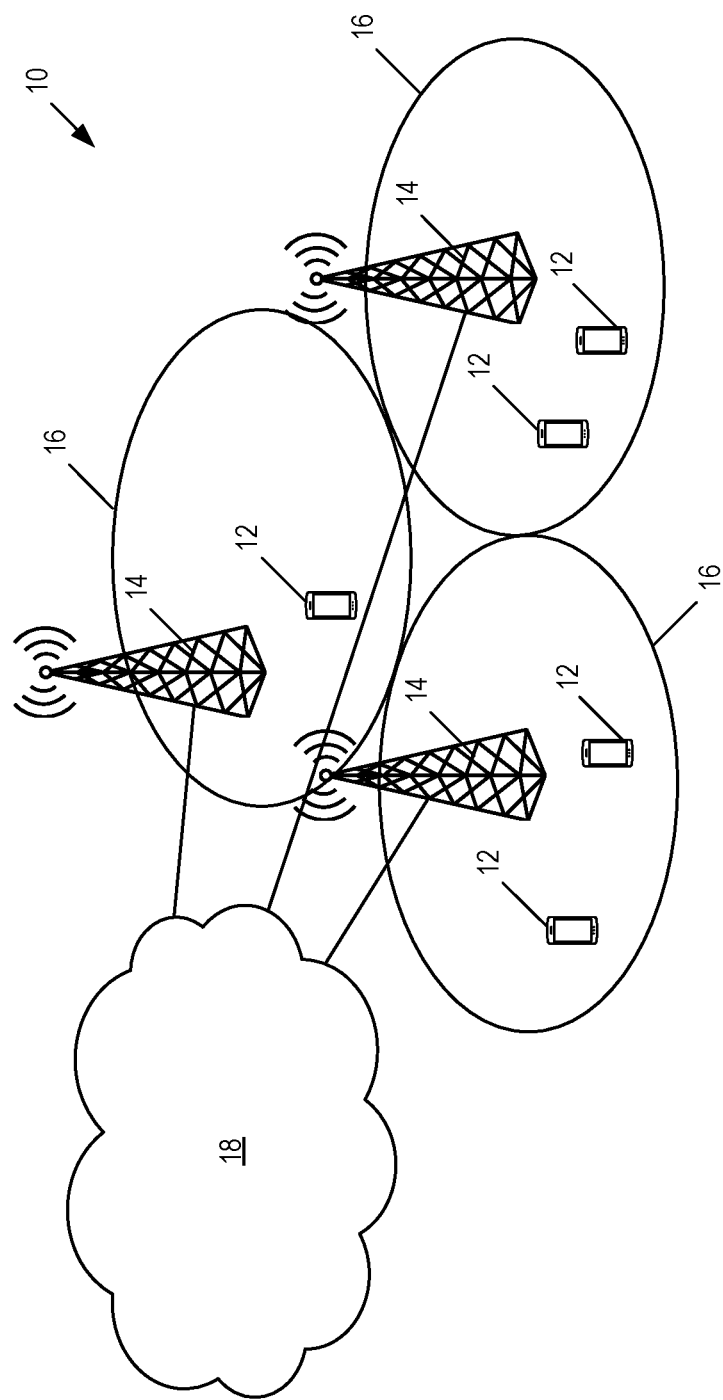
FIG. 3 illustrates one example of a wireless communication system in which embodiments of the present disclosure may be implemented.

In this regard, FIG. 3 illustrates one example of a wireless communication system 10 in which embodiments of the present disclosure may be implemented. The wireless communication system 10 is preferably a 3GPP LTE or 5G NR system, but is not limited thereto. As illustrated, the wireless communication system 10 includes a number of wireless communication devices 12, which are also referred to herein as UEs. In addition, the wireless communication system 10 includes a radio access network that includes a number of radio access nodes 14 (e.g., eNBs or gNBs) serving corresponding coverage areas or cells 16. The radio access nodes 14 are connected to a core network 18, which includes a number of core network nodes, as will be appreciated by one of skill in the art.

Figure 4:
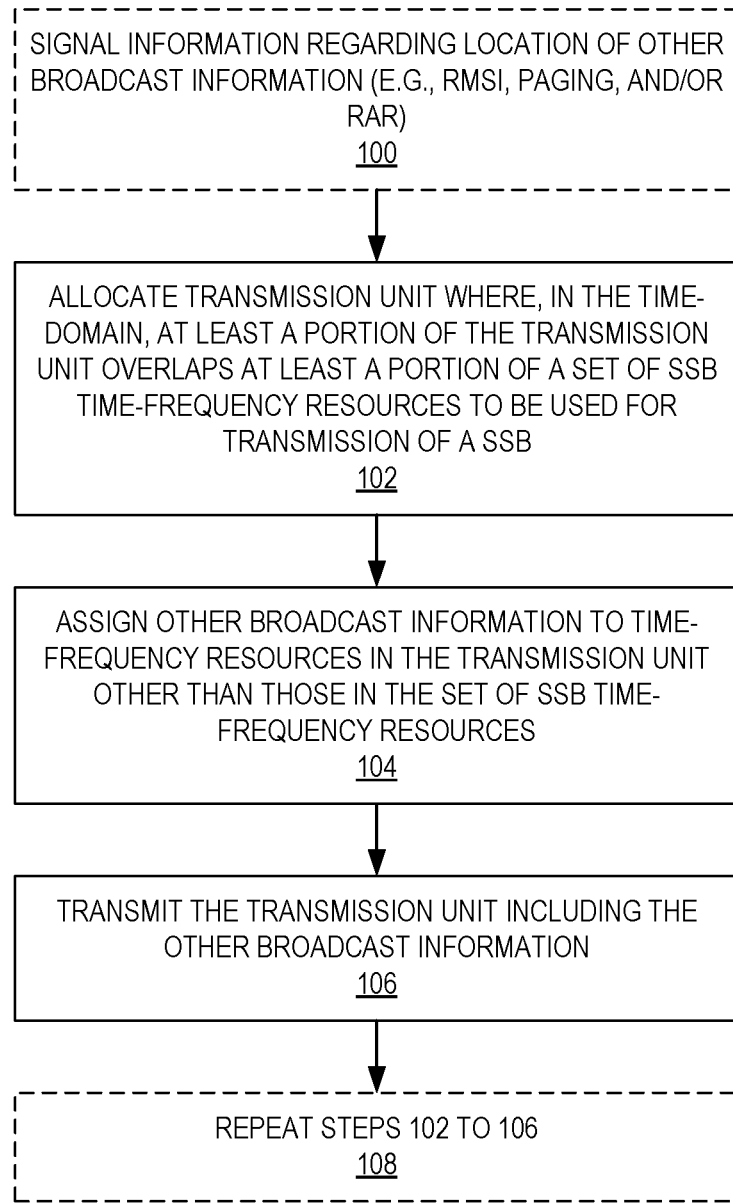
FIG. 4 is a flow chart that illustrates the operation of a radio access node according to some embodiments of the present disclosure.

FIG. 4 is a flow chart that illustrates the operation of a radio access node 14 according to some embodiments of the present disclosure. Optional steps are represented by dashed boxes. As illustrated, the radio access node 14 optionally signals information regarding the time-frequency location of OBI (step 100). Examples of such signaling are provided below. Note that some of the control information that enables the wireless communication device(s) 12 to receive and decode the OBI may additionally or alternatively be included in the transmission unit in which the OBI is collocated with at least a portion of an SSB, as also described below.

The radio access node 14 allocates a transmission unit in time where, in the time domain, at least a portion of the transmission unit overlaps at least a portion of a set of time-frequency resources (referred to herein as a set of SSB time-frequency resources) to be used for transmission of an SSB (step 102). Note that the amount of OBI data is known prior to step 102. As discussed above, SSBs have predefined, periodic fixed locations in time and in frequency. The set of SSB time-frequency resources is defined as the intersection of a set of time domain resources (e.g., symbol periods) and a set of frequency-domain resources (e.g., subcarriers) to be used for transmission of the SSB, which are referred to as a set of time domain SSB resources and a set of frequency-domain SSB resources, respectively. In 3GPP NR, the duration of an SSB is four symbols long. The time duration of the transmission unit is large enough to carry the desired OBI and not so long as to extend into the next SSB, which will have different beamforming. In other words, the SSBs in an SSB burst or burst set will use different beamforming to provide beam sweeping. Thus, the allocation of the transmission unit is performed such that the transmission unit falls within a single beam sweep period (i.e., during a period of time in which the beamforming remains fixed to the beamforming used for the SSB).

In some embodiments, the transmission unit is a mini-slot, which has a duration that is any number of two or more symbols but less than the duration of a full slot. Specifically, a mini-slot is a transmission construction that can start at any Orthogonal Frequency Division Multiplexing (OFDM) symbol of a slot interval and can assume any transmission length in OFDM symbols. Note that while the term mini-slot is used herein, the terminology used for this transmission construction may vary. For example, a mini-slot may alternatively be referred to as a slot or flexible slot that can start at any symbol and have any transmission duration or non-slot-based scheduling or Type B scheduling. As discussed herein, the transmission duration is preferably two or more symbols.

In some embodiments, the transmission unit is allocated such that time-frequency resources to be used for the OBI are frequency division multiplexed with the SSB. More specifically, in some embodiments, the transmission unit is allocated such that the transmission unit includes:
  at least a portion of the set of SSB time-frequency resources that is overlapped by the transmission unit, and
  time-frequency resources (referred to as OBI time-frequency resources) for the OBI to be transmitted, where the OBI time-frequency resources are those time-frequency resources defined as the intersection of: (A) a set of frequency-domain resources (referred to as a set of OBI frequency-domain resources) above and/or below the set of SSB frequency-domain resources (in the frequency-domain) and (B) a set of time domain resources (referred to as OBI time domain resources) that at least partially overlaps with the set of SSB time domain resources.

Figure 5:
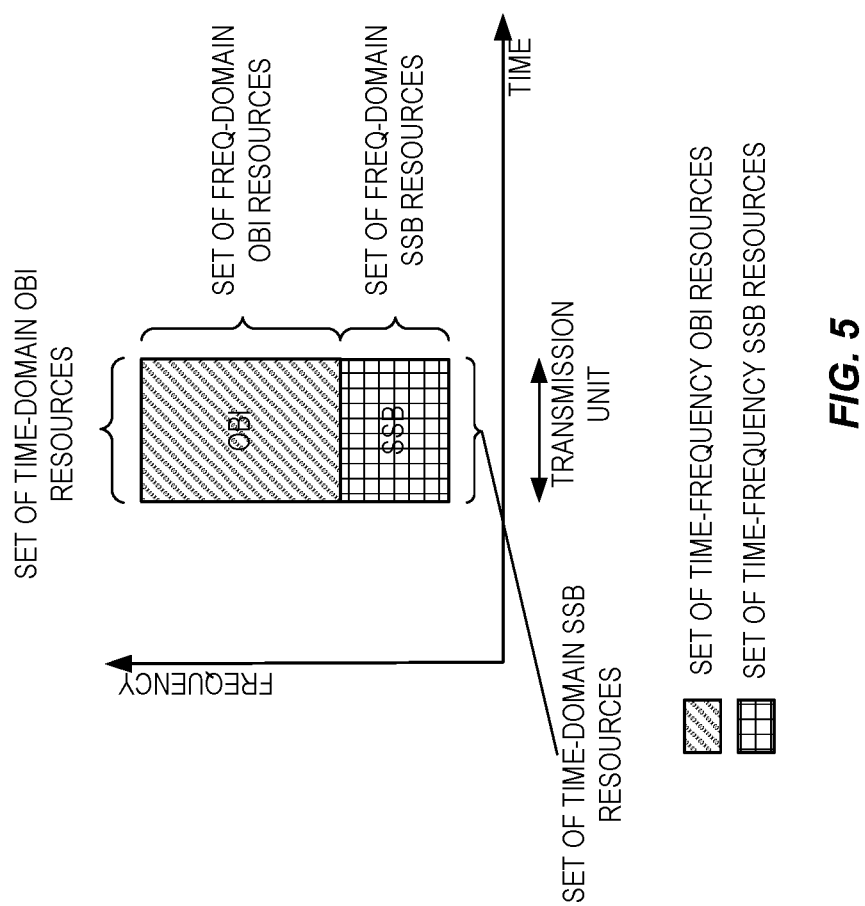
FIG. 5 illustrates one example of frequency division multiplexing of Other Broadcast Information (OBI) with an SS Block (SSB) in accordance with some embodiments of the present disclosure.

One example is illustrated in FIG. 5. Note that, while in this example the set of OBI time-frequency resources is only above the set of SSB time-frequency resources, the set of OBI time-frequency resources may alternatively be below or above and below the SSB time-frequency resources. Further, while in this example the set of OBI time domain resources is equal to the set of SSB time domain resources, the set of OBI time domain resources may alternatively be, e.g., a proper subset of the set of SSB time domain resources or even a super set of the SSB time domain resources (see, e.g., FIG. 7).

In some other embodiments, the transmission unit is allocated such that time-frequency resources to be used for the OBI are time-division multiplexed with the SSB. More specifically, in some embodiments, the transmission unit is allocated such that the transmission unit includes:
  the at least a portion of the set of SSB time-frequency resources that is overlapped by the transmission unit, and
  time-frequency resources (referred to as OBI time-frequency resources) for other broadcast information to be transmitted in the transmission unit.

Figure 6:
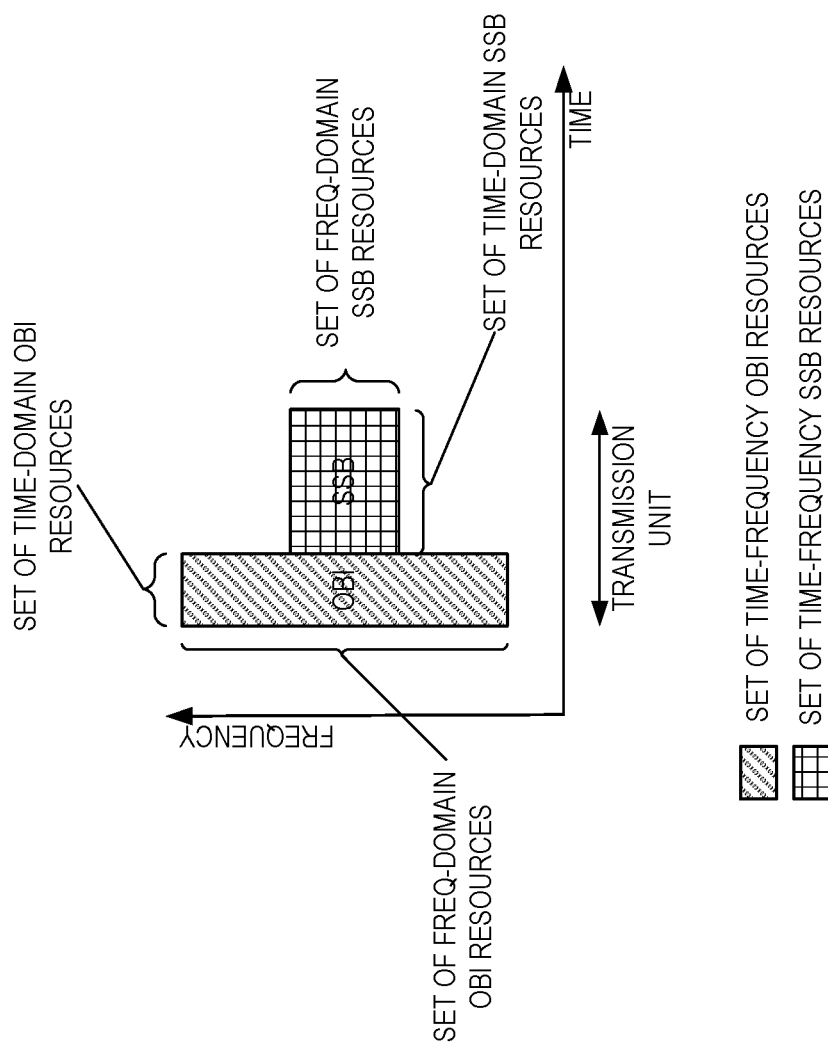
FIG. 6 illustrates one example of time division multiplexing of OBI with an SSB in accordance with some embodiments of the present disclosure.

One example is illustrated in FIG. 6. Note that, while in this example the set of OBI time-frequency resources is only before the set of SSB time-frequency resources in the time domain, the set of OBI time-frequency resources may alternatively be after or both before and after the SSB time-frequency resources in the time domain. Further, while in this example, the set of OBI frequency-domain resources is larger than and including the set of SSB frequency-domain resources, the set of OBI frequency-domain resources may alternatively be, e.g., equal to or a proper subset of the set of SSB frequency-domain resources.

In some other embodiments, the transmission unit is allocated such that time-frequency resources to be used for the OBI are both time and frequency multiplexed with the SSB. More specifically, in some embodiments, the transmission unit is allocated such that the transmission unit includes:

the at least a portion of the set of SSB time-frequency resources that is overlapped by the transmission unit, and time-frequency resources (referred to as OBI time-frequency resources) for OBI to be transmitted in the transmission unit, where the OBI time-frequency resources include:

a first set of OBI time-frequency resources defined as the intersection of: (A) a set of frequency-domain resources (referred to as a first set of OBI frequency-domain resources) above and/or below the set of SSB frequency-domain resources (in the frequency-domain) and (B) a set of time domain resources (referred to as OBI time domain resources) that at least partially overlaps with the set of SSB time domain resources; and a second set of OBI time-frequency resources defined as the intersection of: (A) a second set of frequency-domain resources (referred to as a second set of OBI frequency-domain resources) that at least partially overlaps the set of SSB frequency-domain resources and (B) a second set of time domain resources (referred to as a second set of OBI time domain resources) occurring before and/or after the set of SSB time domain resources.

Figure 7:
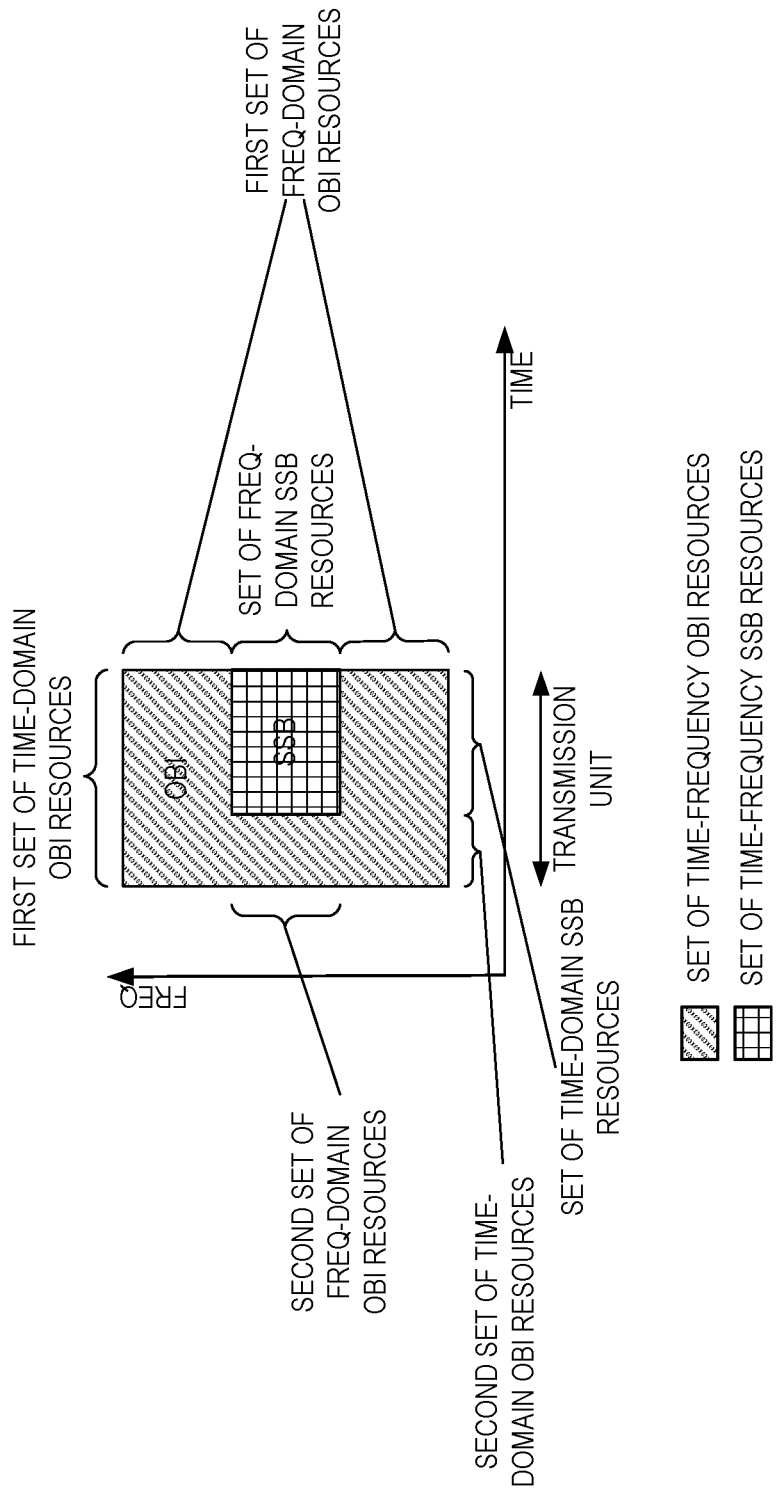
FIG. 7 illustrates one example of time and frequency division multiplexing of OBI with an SSB in accordance with some embodiments of the present disclosure.

One example is illustrated in FIG. 7.

Note that, in some embodiments, the radio access node 14 may intelligently decide whether to use frequency division multiplexing, time division multiplexing, or time and frequency division multiplexing based on any suitable criteria. For example, these criteria may include carrier bandwidth (e.g., is there enough bandwidth to fit additional signals beside the SSB in the frequency domain), the number of SSBs transmitted in the SS burst set, whether there are sufficient resources in the time domain to fit additional signals beside the SSB in the time domain, and/or the like. For the number of SSBs, the benefit from stacking in frequency division multiplexing increases with increasing number of SSBs, since that makes a bigger difference in total overhead. Whether there are sufficient time domain resources has to do with the available space in relation to the transmitted data, preferably between SSBs. If there is sufficient space for a small data packet, the OBI may be transmitted using time division multiplexing but still within the same beam. If not, it may be transmitted in a separate beam. The network node beamforming capabilities could be another criteria, where analog beamforming nodes would prefer frequency division multiplexing whereas it is less important for nodes using digital beamforming. The amount of low latency operations could also be used, as an argument for stacking OBI and SSB in a frequency division multiplexing mode.

Returning to FIG. 4, once the transmission unit is allocated, the radio access node 14 assigns OBI to the OBI time-frequency resources in the transmission unit (step 104). The radio access node 14 then transmits the transmission unit including the OBI (step 106). As will be appreciated by one of skill in the art, a UE receives the transmission unit including the OBI. By assigning the OBI to the OBI time-frequency resources, the OBI is mapped around the at least a portion of the SSB overlapped by the transmission unit. In this manner, the transmission of the OBI does not interfere with the transmission of the SSB and uses the same beamforming as the transmission of the SSB. Further, the duration of the transmission unit is such that it does not interfere with transmission of the next or preceding SSB or a next transmission unit collocated with a next SSB.

Figure 8:
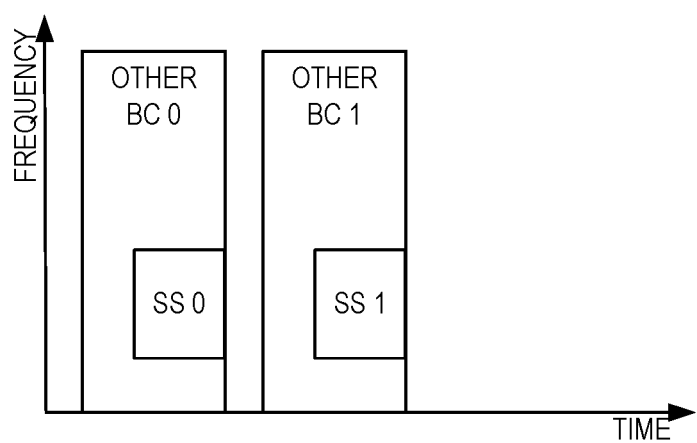
FIG. 8 illustrates an example in which OBI is collocated with successive SSBs in accordance with some embodiments of the present disclosure.
Figure 9:
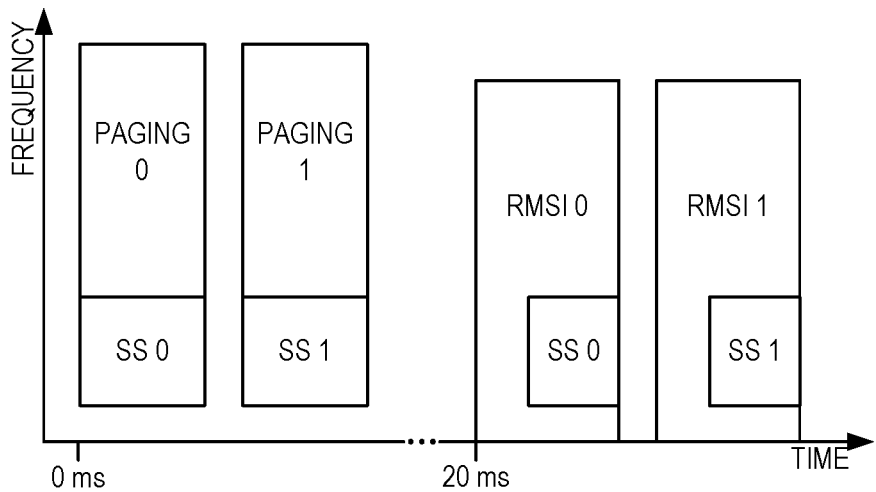
FIG. 9 illustrates transmission of different types of OBI and periodical partitioning of OBI in accordance with some embodiments of the present disclosure.

Optionally, the radio access node 14 repeats steps 102 to 106 to transmit additional OBI that is collocated with upcoming SSBs (step 108). For example, the process may be repeated to transmit multiple instances of paging information and/or RMSI and/or RARs in such a manner that this OBI is collocated with respective SSBs. Examples of this are illustrated in FIGS. 8 and 9. Specifically, FIG. 8 illustrates an example in which OBI is collocated with successive SSBs. In other words, FIG. 8 is an illustration of allocation of transmission units with OBI in relation to SSBs. Note that the same or different OBI can be transmitted with successive SSBs. In another embodiment, the OBI may be divided over multiple SS burst sets such that one kind of OBI, e.g., paging, is transmitted in one SS burst set and, e.g., RMSI is transmitted in another SS burst set. Similarly, RAR may be transmitted in yet another SSB burst set. FIG. 9 illustrates one example of this embodiment. In other words, FIG. 9 is an illustration of different types of OBI and periodical partitioning of OBI. This protocol may then be repeated with the desirable periodicity. Should different broadcast information be transmitted with different periodicity, occasionally, one SS burst set may have to handle multiple broadcast information.

Figure 10:
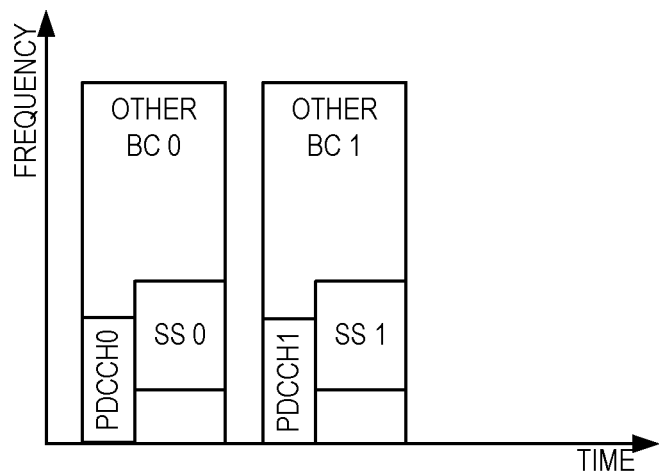
FIG. 10 illustrates Physical Downlink Control Channel (PDCCH) scheduling OBI where the PDCCH is located at the beginning of the corresponding transmission unit in accordance with some embodiments of the present disclosure.

In some embodiments, in order to allow for efficient addressing of the OBI, the NR Physical Broadcast Channel (PBCH) or NR Physical Downlink Control Channel (PDCCH), both containing information about possible locations of RMSI (e.g., System Information (SI) Block (SIB) 1), are configured such that such addressing is relative in either time, frequency, or both time and frequency to the SSB. In some embodiments, the RMSI is SIB1. The PBCH in SSB contains the Master Information Block (MIB). The RMSI complements the MIB with information that the UE needs to know for initial access. An example of PDCCH being included in the transmission units is illustrated in FIG. 10. In other words, FIG. 10 illustrates PDCCH scheduling the broadcast channel located at the beginning of the corresponding transmission unit.

Similarly, the RMSI may contain information about NR-PDCCH and/or NR Physical Downlink Shared Channel (PDSCH) used for paging, e.g., being frequency multiplexed with the SSB. Information that these are transmitted in a transmission unit may also possibly be provided in such signaling. In one embodiment, the information may also indicate whether OBI is located on a higher, lower, or both higher and lower frequency range compared to the SSB.

Related to the above, RAR may also be included, in which case such a RAR configuration is transmitted in the RMSI, where the RMSI may be transmitted on NR-PDSCH where NR-PDSCH is a physical channel.

The format of the transmission unit depends on the amount of information to be fitted into the transmission unit, i.e., what kind of OBI is being transmitted. This, together with the available bandwidth around the SSB, will in one embodiment determine the number of bits to allocate for the transmission unit.

In another embodiment, the transmission unit is defined as covering the SSB in which case the SSB REs are left unused when defining the transmission unit resource allocation whereas, e.g., REs bordering to PSS and Secondary Synchronization Signal (SSS) may be allocated, e.g., for RMSI (i.e., the RMSI may be transmitted on NR-PDSCH). In other words, in some embodiments, the REs in which the SSB is transmitted are viewed as being part of the transmission unit whereas, in other embodiments, the REs in which the SSB is transmitted are viewed as being excluded from the transmission unit. Whether or not the REs in which the SSB is transmitted are considered part of the transmission unit, the receiving UE will know the REs in which the SSB is transmitted and will not use those REs when decoding the OBI transmitted in the transmission unit.

In order to simplify addressing, it is possible to allocate an "NR-SIB1 sweep indicator" information bit in the PBCH for indicating whether RMSI is collocated or not. As a consequence of the value of this bit, the interpretation of the remaining bits in the NR-PDCCH_SIB1_Config (configuration of PDCCH used to schedule SIB1/OBI) in NR MIB differ whether this bit is set or not.

In one embodiment, the numerology (the Sub-Carrier Spacing (SCS)) between the SSB and OBI differs, in which case the switching pattern is preferable in a way that it includes an integer number of the longer symbols (then it will also include an integer number of shorter symbols).

In some embodiments, the NR-PBCH (MIB) contains the PDCCH or search space definition for the broadcast information (e.g., SIB1 where SIB1 is part of OBI). In NR, the PDCCH search space definition contains the Control Channel Resource Set (CORESET) specifying the OFDM symbol(s) and frequency allocation of the search space. For a mini-slot, the CORESET can be allocated within a slot duration; in the described embodiments the CORESET used to schedule broadcast information in a mini-slot is preferably located at the beginning of the corresponding mini-slot, as illustrated in FIG. 10. The PDCCH scheduling the mini-slot contains then among others the time allocation and frequency allocation of the scheduled OBI. In some embodiments some parts of the time and frequency information can also be fixed in the standard or contained in the PBCH.

Figure 11:
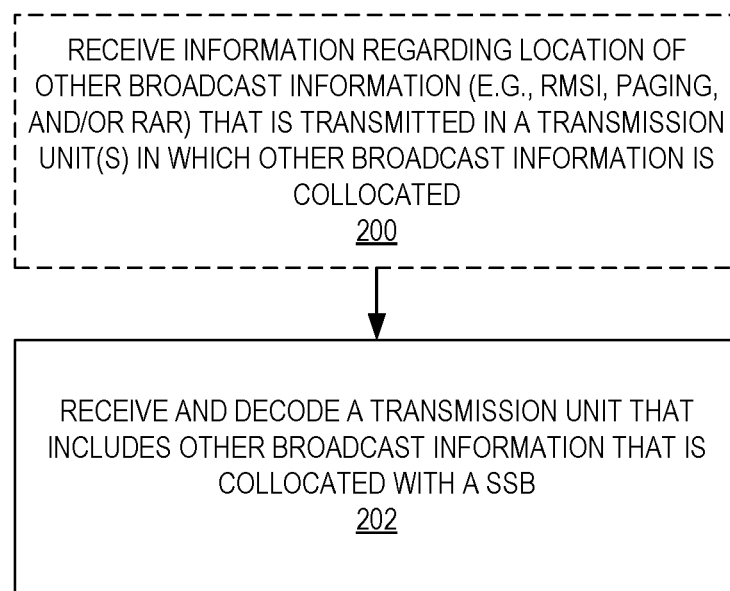
FIG. 11 is a flow chart that illustrates the operation of a wireless communication device in accordance with some embodiments of the present disclosure.

FIG. 11 is a flow chart that illustrates the operation of a wireless communication device 12 in accordance with some embodiments of the present disclosure. Again, optional steps are represented by dashed boxes. As illustrated, the wireless communication device 12 optionally receives information (e.g., SI and/or control signaling) regarding the location of OBI that is transmitted in a transmission unit(s) in which the OBI is collocated with an SSB (step 200). The wireless communication device 12 receives and decodes a transmission unit that includes OBI that is collocated with an SSB, as described above (step 202). For example, the transmission unit transmitted by the radio access node in step 106 of FIG. 4 is received and decoded by the wireless communication device 12.

Figure 12:
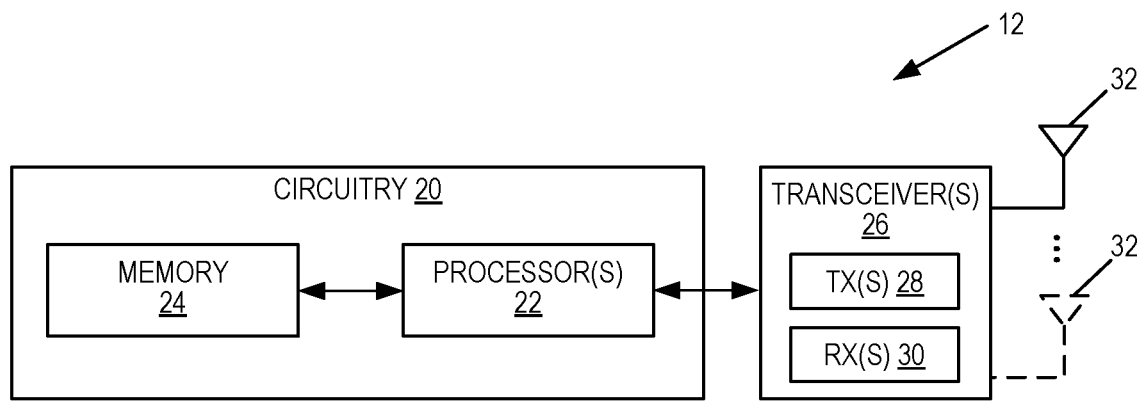
FIGS. 12 and 13 illustrate example embodiments of the wireless communication device.

FIG. 12 is a schematic block diagram of the wireless communication device 12, or UE, according to some embodiments of the present disclosure. As illustrated, the wireless communication device 12 includes circuitry 20 comprising one or more processors 22 (e.g., Central Processing Units (CPUs), Application Specific Integrated Circuits (ASICs), Field Programmable Gate Arrays (FPGAs), Digital Signal Processors (DSPs), and/or the like) and memory 24. The wireless communication device 12 also includes one or more transceivers 26 each including one or more transmitters 28 and one or more receivers 30 coupled to one or more antennas 32. In some embodiments, the functionality of the wireless communication device 12 described herein may be implemented in hardware (e.g., via hardware within the circuitry 20 and/or within the processor(s) 22) or be implemented in a combination of hardware and software (e.g., fully or partially implemented in software that is, e.g., stored in the memory 24 and executed by the processor(s) 22).

In some embodiments, a computer program including instructions which, when executed by the at least one processor 22, causes the at least one processor 22 to carry out at least some of the functionality of the wireless communication device 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 13:
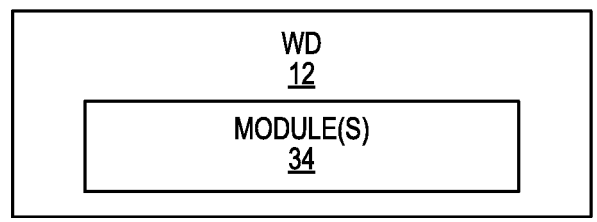

FIG. 13 is a schematic block diagram of the wireless communication device 12, or UE, according to some other embodiments of the present disclosure. The wireless communication device 12 includes one or more modules 34, each of which is implemented in software. The module(s) 34 provide the functionality of the wireless communication device 12 described herein (e.g., as described with respect to FIG. 11).

Figure 14:
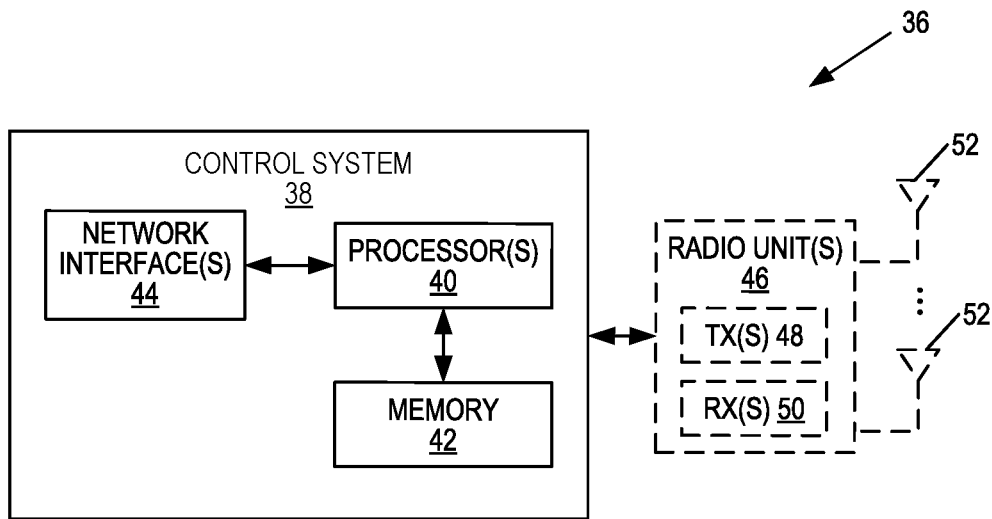
FIGS. 14 through 16 illustrate example embodiments of a network node.

FIG. 14 is a schematic block diagram of a network node 36 (e.g., a radio access node 14 such as, for example, an eNB or gNB) according to some embodiments of the present disclosure. As illustrated, the network node 36 includes a control system 38 that includes circuitry comprising one or more processors 40 (e.g., CPUs, ASICs, DSPs, FPGAs, and/or the like) and memory 42. The control system 38 also includes a network interface 44. In embodiments in which the network node 36 is a radio access node 14, the network node 36 also includes one or more radio units 46 that each include one or more transmitters 48 and one or more receivers 50 coupled to one or more antennas 52. In some embodiments, the functionality of the network node 36 (specifically the functionality of the radio access node 14) described above may be fully or partially implemented in software that is, e.g., stored in the memory 42 and executed by the processor(s) 40.

Figure 15:
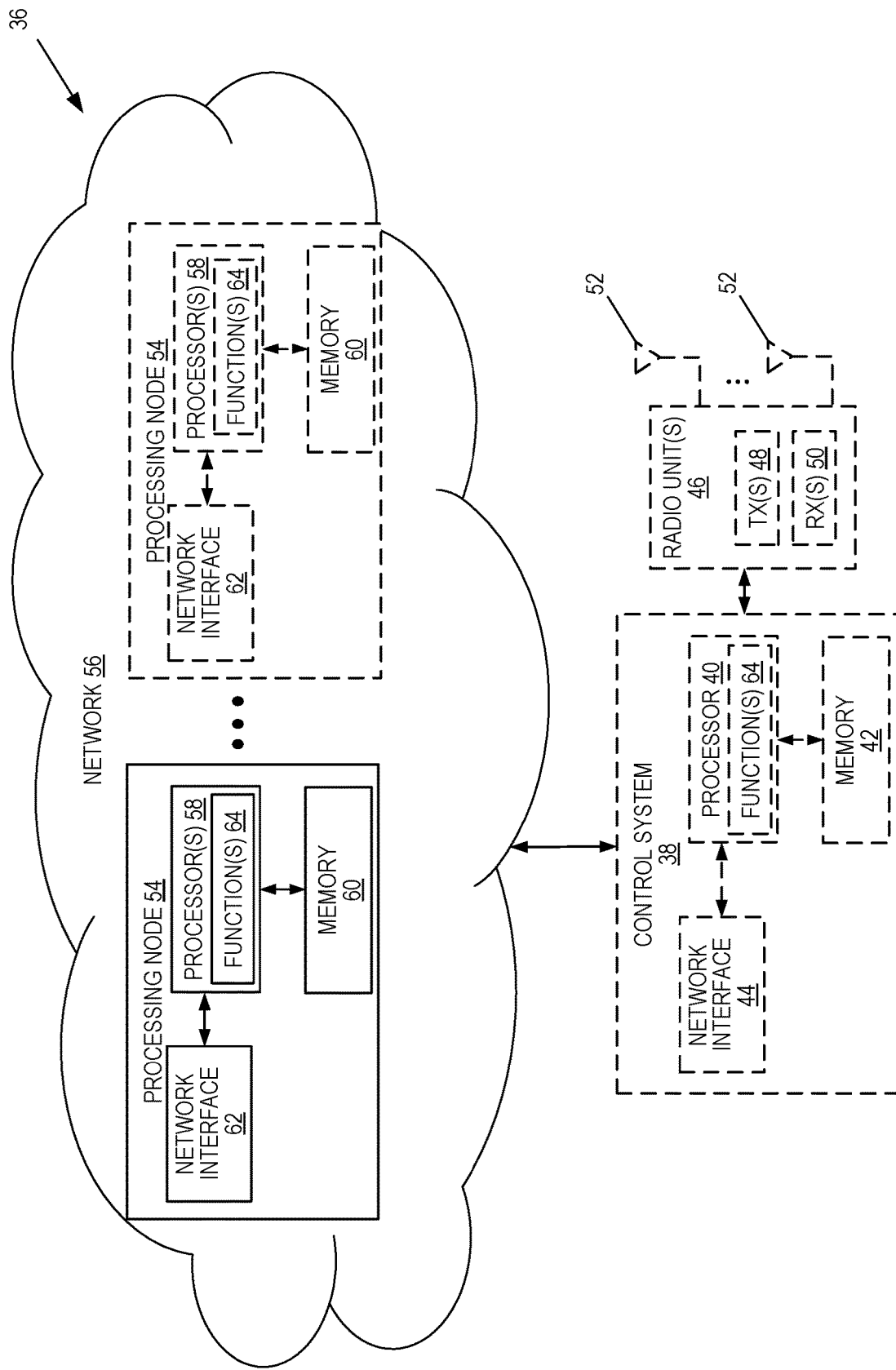

FIG. 15 is a schematic block diagram that illustrates a virtualized embodiment of the network node 36 (e.g., the radio access node 14) according to some embodiments of the present disclosure. As used herein, a "virtualized" network node 36 is a network node 36 in which at least a portion of the functionality of the network node 36 is implemented as a virtual component (e.g., via a virtual machine(s) executing on a physical processing node(s) in a network(s)). As illustrated, the network node 36 optionally includes the control system 38, as described with respect to FIG. 14. In addition, if the network node 36 is the radio access node 14, the network node 36 also includes the one or more radio units 46, as described with respect to FIG. 14. The control system 38 (if present) is connected to one or more processing nodes 54 coupled to or included as part of a network(s)

56 via the network interface 44. Alternatively, if the control system 38 is not present, the one or more radio units 46 (if present) are connected to the one or more processing nodes 54 via a network interface(s). Alternatively, all of the functionality of the network node 36 (e.g., all of the functionality of the radio access node 14) described herein may be implemented in the processing nodes 54. Each processing node 54 includes one or more processors 58 (e.g., CPUs, ASICs, DSPs, FPGAs, and/or the like), memory 60, and a network interface 62.

In this example, functions 64 of the network node 36 (e.g., the functions of the radio access node 14) described herein are implemented at the one or more processing nodes 54 or distributed across the control system 38 (if present) and the one or more processing nodes 54 in any desired manner. In some particular embodiments, some or all of the functions 64 of the network node 36 described herein are implemented as virtual components executed by one or more virtual machines implemented in a virtual environment(s) hosted by the processing node(s) 54. As will be appreciated by one of ordinary skill in the art, additional signaling or communication between the processing node(s) 54 and the control system 38 (if present) or alternatively the radio unit(s) 46 (if present) is used in order to carry out at least some of the desired functions. Notably, in some embodiments, the control system 38 may not be included, in which case the radio unit(s) 46 (if present) communicates directly with the processing node(s) 54 via an appropriate network interface(s).

In some particular embodiments, higher layer functionality (e.g., layer 3 and up and possibly some of layer 2 of the protocol stack) of the network node 36 may be implemented at the processing node(s) 54 as virtual components (i.e., implemented "in the cloud") whereas lower layer functionality (e.g., layer 1 and possibly some of layer 2 of the protocol stack) may be implemented in the radio unit(s) 46 and possibly the control system 38.

In some embodiments, a computer program including instructions which, when executed by the at least one processor 40, 58, causes the at least one processor 40, 58 to carry out the functionality of the network node 36 or a processing node 54 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 42, 60).

Figure 16:
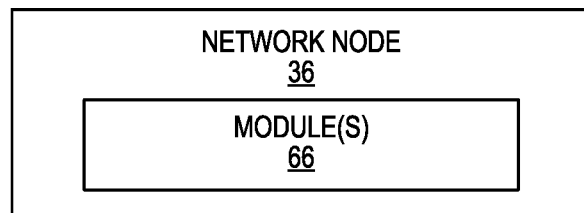

FIG. 16 is a schematic block diagram of the network node 36 (e.g., the radio access node 14) according to some other embodiments of the present disclosure. The network node 36 includes one or more modules 66, each of which is implemented in software. The module(s) 66 provide the functionality of the network node 36 described herein. In some embodiments, the module(s) 66 comprise, for example, an optional signaling module operable to perform the function of step 100 of FIG. 4, an allocation module operable to perform the function of step 102 of FIG. 4, an assigning module operable to perform the function of step 104 of FIG. 4, a transmitting module operable to perform the function of step 106 of FIG. 4, and an optional repeating module operable to perform the function of step 108 of FIG. 4.

The systems and methods disclosed herein have numerous advantages. For example, the systems and methods disclosed herein provide a more efficient utilization of resources, resulting in higher link and system capacity as well as lower network power consumption from increased stand-by times.

The alternative to embodiments disclosed herein would transmit the OBI at different time instants compared to the SSB. This would require at least two beam sweeps during which time it would be difficult for the network to schedule data traffic. In analog beamforming, in particular, where all subcarriers are directed in the same direction, it would mean that in order to transmit the remaining resources not used for SSBs or OBI, in order to schedule data traffic to a UE, it would need to be located in the direction of the beam transmitting the broadcast information or be scheduled with a correspondingly lower Modulation and Coding Scheme (MCS) resulting from the UE's suboptimal location relative to the beam. The likelihood for this is quite small, why it would result in an inefficient system utilization. For digital beamforming the situation is less critical. However, in order to schedule a UE it would require that it didn't interfere with the broadcast transmission, also for this case limiting the scheduling options. The embodiments disclosed herein minimize the above problem by scheduling as much broadcast information as possible at the same time, thereby allowing more time to be used for data traffic. Since the transmission of SS blocks is predefined it means that the scheduling of the OBI is aligned with that of SS block transmissions. Also, since SS blocks may be transmitted twice every slot special care needs to be taken in order to manage such transmissions. If many SSBs are transmitted per slot, less resources are available to transmit OBI per SSB.

The corresponding problem does not exist in LTE since beamforming was not utilized for broadcast information, and didn't allow for configuring mini-slots.

While not being limited thereto, some example embodiments of the present disclosure are provided below.

Embodiment 1

A method of operation of a network node (14, 36) in a wireless communication system (10), comprising: allocating (102) a transmission unit where, in the time domain, at least a portion of the transmission unit overlaps at least a portion of a set of SSB time-frequency resources to be used for transmission of an SSB; assigning (104) other broadcast information to time-frequency resources in the transmission unit other than those in the set of SSB time-frequency resources; and transmitting (106), or causing transmission of, the transmission unit comprising the other broadcast information.

Embodiment 2

The method of embodiment 1 wherein: the SSB is one of a plurality of SSBs in an SS burst; each SSB in the plurality of SSBs in the SS burst is transmitted with different beamforming; and transmitting (106), or causing transmission of, the transmission unit comprises transmitting (106), or causing transmission of, the transmission unit utilizing the beamforming for the SSB in the SS burst.

Embodiment 3

The method of embodiment 2 wherein allocating (102) the transmission unit comprises allocating (102) the transmission unit such that a duration of the transmission unit does not extend to a next SSB in the SS burst.

Embodiment 4

The method of any one of embodiments 1 to 3 wherein: allocating (102) the transmission unit comprises allocating (102) the transmission unit such that the transmission unit comprises a set of OBI time-frequency resources that are frequency division multiplexed with the at least a portion of the set of SSB time-frequency resources overlapped by the transmission unit; and assigning (104) the other broadcast information to the time-frequency resources in the transmission unit other than those in the set of SSB time-frequency resources comprises assigning (104) the other broadcast information to the set of OBI time-frequency resources.

Embodiment 5

The method of any one of embodiments 1 to 3 wherein: allocating (102) the transmission unit comprises allocating (102) the transmission unit such that the transmission unit comprises a set of OBI time-frequency resources that are time division multiplexed with the at least a portion of the set of SSB time-frequency resources overlapped by the transmission unit; and assigning (104) the other broadcast information to the time-frequency resources in the transmission unit other than those in the set of SSB time-frequency resources comprises assigning (104) the other broadcast information to the set of OBI time-frequency resources.

Embodiment 6

The method of any one of embodiments 1 to 3 wherein: allocating (102) the transmission unit comprises allocating (102) the transmission unit such that the transmission unit comprises a set of OBI time-frequency resources that are time and frequency division multiplexed with the at least a portion of the set of SSB time-frequency resources overlapped by the transmission unit; and assigning (104) the other broadcast information to the time-frequency resources in the transmission unit other than those in the set of SSB time-frequency resources comprises assigning (104) the other broadcast information to the set of OBI time-frequency resources.

Embodiment 7

The method of any one of embodiments 4 to 6 wherein the set of OBI time-frequency resources is a function of a location of the SSB.

Embodiment 8

The method of any one of embodiments 1 to 7 further comprising repeating (108) the steps of allocating (102), assigning (104), and transmitting (106), or causing transmission, for a plurality of SSBs.

Embodiment 9

The method of any one of embodiments 1 to 7 further comprising repeating (108) the steps of allocating (102), assigning (104), and transmitting (106), or causing transmission, for a plurality of SSBs across a plurality of SS bursts, where different types of other broadcast information are transmitted in different SS bursts.

Embodiment 10

The method of any one of embodiments 1 to 9 wherein the transmission unit comprises a control channel comprising information indicative of a location of the other broadcast information within the transmission unit.

Embodiment 11

The method of any one of embodiments 1 to 10 further comprising transmitting information that indicates whether other broadcast information is collocated with SSBs.

Embodiment 12

The method of any one of embodiments 1 to 11 further comprising transmitting information about the other broadcast information being frequency division multiplexed, time division multiplexed, or time and frequency multiplexed with the SSB.

Embodiment 13

The method of any one of embodiments 1 to 12 wherein a duration of the transmission unit is longer than that of the SSB.

Embodiment 14

The method of any one of embodiments 1 to 13 wherein allocating (102) the transmission unit comprises allocating (102) the transmission unit such that a duration of the transmission unit is a function of an amount of other broadcast information to be transmitted in the transmission unit and an available bandwidth to be used by the transmission unit.

Embodiment 15

The method of any one of embodiments 1 to 10 wherein the other broadcast information comprises paging messages, RMSI, and/or RAR messages.

Embodiment 16

A network node (14, 36) for a wireless communication system, the network node (14, 36) adapted to: allocate a transmission unit where, in the time-domain, at least a portion of the transmission unit overlaps at least a portion of a set of SSB time-frequency resources to be used for transmission of an SSB; assign other broadcast information to time-frequency resources in the transmission unit other than those in the set of SSB time-frequency resources; and transmit the transmission unit comprising the other broadcast information or cause transmission of the transmission unit comprising the other broadcast information by a remote radio unit(s).

Embodiment 17

The network node (14, 36) of embodiment 12 wherein the network node (14, 36) is further adapted to perform the method of any one of embodiments 2 to 15.

Embodiment 18

A network node (14, 36) for a wireless communication system (10), comprising: circuitry (40, 42, 58, 60) operable to: allocate a transmission unit where, in the time domain, at least a portion of the transmission unit overlaps at least a portion of a set of SSB time-frequency resources to be used for transmission of an SSB; assign other broadcast information to time-frequency resources in the transmission unit other than those in the set of SSB time-frequency resources; and transmit the transmission unit comprising the other broadcast information or cause transmission of the transmission unit comprising the other broadcast information by a remote radio unit(s).

Embodiment 19

The network node (14, 36) of embodiment 12 wherein the circuitry (40, 42, 58, 60) is further operable to perform the method of any one of embodiments 2 to 15.

Embodiment 20

A network node (14, 36) for a wireless communication system (10), comprising: an allocating module (66) operable to allocate a transmission unit where, in the time domain, at least a portion of the transmission unit overlaps at least a portion of a set of SSB time-frequency resources to be used for transmission of an SSB; an assigning module (66) operable to assign other broadcast information to time-frequency resources in the transmission unit other than those in the set of SSB time-frequency resources; and a transmitting module (66) operable to transmit the transmission unit comprising the other broadcast information or cause transmission of the transmission unit comprising the other broadcast information by a remote radio unit(s).

Embodiment 21

The network node (14, 36) of embodiment 16 wherein the modules (66) and/or additional modules (66) are operable to perform the method of any one of embodiments 2 to 15.

Embodiment 22

A computer program comprising instructions which, when executed on at least one processor, cause the at least one processor to carry out the method according to any one of embodiments 1 to 15.

Embodiment 23

A carrier containing the computer program of embodiment 22, wherein the carrier is one of an electronic signal, an optical signal, a radio signal, or a computer readable storage medium.

Embodiment 24

A method of operation of wireless communication device (12) for a wireless communication system (10), comprising: receiving and decoding (202) a transmission unit in which other broadcast information is collocated with at least a portion of an SSB.

Embodiment 25

A wireless network node (e.g., a radio access node (14)) transmitting periodically transmitted, fixed located broadcast signals (PSS, SSS, PBCH) together with scheduled (broadcast) signals (PDSCH_SIB, Paging, RAR, ... ), the method comprising: configuring a transmission unit (e.g., a mini-slot) with a duration long enough to carry the desired payload but not too long to overlap a subsequent SSB and at least partly coinciding with an SSB transmission; allocating Paging, SIB1, RAR, ... messages to the transmission unit; and (simultaneously, unless different lengths) transmitting the transmission unit and the SSB.

Embodiment 26

The wireless network node of embodiment 25 where the configuration of the transmission unit is related to the SSB location.

Embodiment 27

The wireless network node of embodiment 26 where the NR-PBCH/PDCCH includes information about SIB1 being frequency multiplexed with the SSB and/or transmitted in a transmission unit to provide efficient, relative addressing of SIB1 where the relative addressing (relative to the SSB) refers to time and/or frequency.

Embodiment 28

The wireless network node of embodiment 25 where the NR-SIB1 includes information about NR-PDCCH/NR-PDSCH used for paging being frequency multiplexed with the SSB and/or transmitted in a transmission unit.

Embodiment 29

The wireless network node of embodiment 25 where the location of the scheduled channels may be on a lower/higher/both frequency related to the SSB.

Embodiment 30

The wireless network node of embodiment 25 wherein the transmission unit is longer than the SSB.

Embodiment 31

The wireless network node of embodiment 25 where the duration (symbols) of the transmission unit is determined by the amount of information comprised in the transmission unit and the available bandwidth to be used by the transmission unit.

The following acronyms are used throughout this disclosure.
- 3GPP Third Generation Partnership Project
- 5G Fifth Generation
- ASIC Application Specific Integrated Circuit
- CORESET Control Channel Resource Set
- CPU Central Processing Unit
- DCI Downlink Control Information
- DMRS Demodulation Reference Signal
- DSP Digital Signal Processor
- DTX Discontinuous Transmission
- eNB Enhanced or Evolved Node B
- FPGA Field Programmable Gate Array
- GHz Gigahertz
- gNB New Radio Base Station
- ID Identifier
- LTE Long Term Evolution
- MCS Modulation and Coding Scheme
- MIB Master Information Block
- MME Mobility Management Entity
- ms Millisecond
- MTC Machine Type Communication NR New Radio
OBI Other Broadcast Information
OFDM Orthogonal Frequency Division Multiplexing
PBCH Physical Broadcast Channel
PCI Physical Cell Identity
PDCCH Physical Downlink Control Channel
PDSCH Physical Downlink Shared Channel
P-GW Packet Data Network Gateway
ppm Parts Per Million
PRACH Physical Random Access Channel
P-RNTI Paging Radio Network Temporary Identifier
PSS Primary Synchronization Signal
RAR Random Access Response
RE Resource Element
RMSI Remaining Minimum System Information
SCEF Service Capability Exposure Function
SCS Sub-Carrier Spacing
SFN Single-Frequency Network
SI System Information
SIB System Information Block
SS Synchronization Signal
SSB Synchronization Signal Block
SSS Secondary Synchronization Signal
TRP Transmission and Reception Point
UE User Equipment
URLLC Ultra-Reliable and Low Latency Communication Those skilled in the art will recognize improvements and modifications to the embodiments of the present disclosure. All such improvements and modifications are considered within the scope of the concepts disclosed herein.

What is claimed is:

1. A method of operation of a network node in a wireless communication system, comprising:
   allocating a transmission unit where, in a time domain, at least a portion of the transmission unit overlaps at least a portion of a set of Synchronization Signal Block, SSB, time-frequency resources to be used for transmission of an SSB, wherein the transmission unit is a transmission unit having a duration that is two or more symbols but less than a duration of a full slot;
   assigning Other Broadcast Information, OBI, to time-frequency resources in the transmission unit; and
   transmitting, or causing transmission of, the transmission unit comprising the OBI; wherein:
   the SSB comprises a Primary Synchronization Signal, PSS, a Secondary Synchronization Signal, SSS, and a Physical Broadcast Channel, PBCH; and
   the OBI comprises paging messages, Remaining Minimum System Information, RMSI, and/or Random Access Response, RAR, messages.

2. The method of claim 1 wherein:
   the SSB is one of a plurality of SSBs in a Synchronization Signal, SS, burst and/or SSB burst set;
   at least some SSBs in the plurality of SSBs in the SS burst and/or SSB burst set are transmitted with different beamforming; and
   transmitting, or causing transmission of, the transmission unit comprises transmitting, or causing transmission of, the transmission unit utilizing the beamforming for the SSB in the SS burst and/or the SSB burst set.

3. The method of claim 2 wherein allocating the transmission unit comprises allocating the transmission unit such that the duration of the transmission unit does not extend to a next SSB in the SS burst.

4. The method of claim 1 wherein:
   allocating the transmission unit comprises allocating the transmission unit such that the transmission unit comprises a set of OBI time-frequency resources that are frequency division multiplexed with the at least a portion of the set of SSB time-frequency resources overlapped by the transmission unit; and
   assigning the OBI to the time-frequency resources in the transmission unit other than those in the set of SSB time-frequency resources comprises assigning the OBI to the set of OBI time-frequency resources.

5. The method of claim 4 wherein the set of OBI time-frequency resources is a function of a location of the SSB.

6. The method of claim 1 wherein:
   allocating the transmission unit comprises allocating the transmission unit such that the transmission unit comprises a set of OBI time-frequency resources that are time division multiplexed with the at least a portion of the set of SSB time-frequency resources overlapped by the transmission unit; and
   assigning the OBI to the time-frequency resources in the transmission unit other than those in the set of SSB time-frequency resources comprises assigning the OBI to the set of OBI time-frequency resources.

7. The method of claim 1 wherein:
   allocating the transmission unit comprises allocating the transmission unit such that the transmission unit comprises a set of OBI time-frequency resources that are time and frequency division multiplexed with the at least a portion of the set of SSB time-frequency resources overlapped by the transmission unit; and
   assigning the OBI to the time-frequency resources in the transmission unit other than those in the set of SSB time-frequency resources comprises assigning the OBI to the set of OBI time-frequency resources.

8. The method of claim 1 further comprising repeating the steps of allocating, assigning, and transmitting, or causing transmission, for a plurality of SSBs.

9. The method of claim 1 further comprising repeating the steps of allocating, assigning, and transmitting, or causing transmission, for a plurality of SSBs across a plurality of SS bursts and/or SSB burst sets, where different types of OBI are transmitted in different SS bursts and/or SSB burst sets.

10. The method of claim 1 wherein the transmission unit comprises a control channel comprising information indicative of a location of the OBI within the transmission unit.

11. The method of claim 1 further comprising transmitting information that indicates whether the OBI is collocated with SSBs.

12. The method of claim 1 further comprising transmitting information about the OBI being frequency division multiplexed, time division multiplexed, or time and frequency multiplexed with the SSB.

13. The method of claim 1 wherein the duration of the transmission unit is longer than that of the SSB.

14. The method of claim 1 wherein allocating the transmission unit comprises allocating the transmission unit such that the duration of the transmission unit is a function of an amount of OBI to be transmitted in the transmission unit and an available bandwidth to be used by the transmission unit.

15. The method of claim 1 wherein the RMSI is System Information Block 1, SIB1.

16. The method of claim 1 wherein the at least a portion of the set of SSB time-frequency resources is part of the transmission unit, and assigning the OBI to the time-frequency resources in the transmission unit comprises assigning the OBI to time-frequency resources in the transmission unit different from those in the at least a portion of the set of SSB time-frequency resources that are part of the transmission unit.

17. The method of claim 1 wherein the at least a portion of the set of SSB time-frequency resources is not part of the transmission unit, and assigning the OBI to the time-frequency resources in the transmission unit comprises assigning the OBI to time-frequency resources in the transmission unit that are overlapped, in time and/or frequency, by the at least a portion of the set of SSB time-frequency resources.

18. A network node for a wireless communication system, the network node adapted to:
allocate a transmission unit where, in a time-domain, at least a portion of the transmission unit overlaps at least a portion of a set of Synchronization Signal Block, SSB, time-frequency resources to be used for transmission of an SSB, wherein the transmission unit is a transmission unit having a duration that is two or more symbols but less than a duration of a full slot;
assign Other Broadcast Information, OBI, to time-frequency resources in the transmission unit; and
transmit the transmission unit comprising the OBI or cause transmission of the transmission unit comprising the OBI by a remote radio unit(s);
wherein:
the SSB comprises a Primary Synchronization Signal, PSS, a Secondary Synchronization Signal, SSS, and a Physical Broadcast Channel, PBCH; and
the OBI comprises paging messages, Remaining Minimum System Information, RMSI, and/or Random Access Response, RAR, messages.

19. A network node for a wireless communication system, comprising:
circuitry operable to:
allocate a transmission unit where, in a time domain, at least a portion of the transmission unit overlaps at least a portion of a set of Synchronization Signal Block, SSB, time-frequency resources to be used for transmission of an SSB, wherein the transmission unit is a transmission unit having a duration that is two or more symbols but less than a duration of a full slot;
assign Other Broadcast Information, OBI, to time-frequency resources in the transmission unit; and
transmit the transmission unit comprising the OBI or cause transmission of the transmission unit comprising the OBI by a remote radio unit(s);
wherein:
the SSB comprises a Primary Synchronization Signal, PSS, a Secondary Synchronization Signal, SSS, and a Physical Broadcast Channel, PBCH; and
the OBI comprises paging messages, Remaining Minimum System Information, RMSI, and/or Random Access Response, RAR, messages.

20. A method of operation of a wireless communication device for a wireless communication system, comprising:
receiving and decoding a transmission unit in which Other Broadcast Information, OBI, is collocated with at least a portion of a Synchronization Signal Block, SSB, wherein:
the transmission unit is a transmission unit having a duration that is two or more symbols but less than a duration of a full slot;
the SSB comprises a Primary Synchronization Signal, PSS, a Secondary Synchronization Signal, SSS, and a Physical Broadcast Channel, PBCH; and
the OBI comprises paging messages, Remaining Minimum System Information, RMSI, and/or Random Access Response, RAR, messages.

21. The method of claim 20 wherein the OBI is time-multiplexed with the at least a portion of the SSB.

22. The method of claim 20 wherein the OBI is frequency-multiplexed with the at least a portion of the SSB.

23. The method of claim 20 wherein the OBI is time and frequency multiplexed with the at least a portion of the SSB.

24. The method of claim 20 wherein:
in a time domain, at least a portion of the transmission unit overlaps at least a portion of a set of SSB time-frequency resources used for transmission of the SSB; and
the transmission unit comprises a set of OBI time-frequency resources that are time division multiplexed with the at least a portion of the set of SSB time-frequency resources overlapped by the transmission unit, the set of OBI time-frequency resources being a set of time-frequency resources used for transmission of the OBI.

25. The method of claim 24 wherein the set of OBI time-frequency resources is a function of a location of the SSB.

26. The method of claim 24 wherein the at least a portion of the set of SSB time-frequency resources is part of the transmission unit.

27. The method of claim 24 wherein the at least a portion of the set of SSB time-frequency resources is not part of the transmission unit.

28. The method of claim 20 wherein:
in a time domain, at least a portion of the transmission unit overlaps at least a portion of a set of SSB time-frequency resources used for transmission of the SSB; and
the transmission unit comprises a set of OBI time-frequency resources that are frequency division multiplexed with the at least a portion of the set of SSB time-frequency resources overlapped by the transmission unit, the set of OBI time-frequency resources being a set of time-frequency resources used for transmission of the OBI.

29. The method of claim 20 wherein:
in a time domain, at least a portion of the transmission unit overlaps at least a portion of a set of SSB time-frequency resources used for transmission of the SSB; and
the transmission unit comprises a set of OBI time-frequency resources that are both time and frequency division multiplexed with the at least a portion of the set of SSB time-frequency resources overlapped by the transmission unit, the set of OBI time-frequency resources being a set of time-frequency resources used for transmission of the OBI.

30. The method of claim 20 wherein:
the SSB is one of a plurality of SSBs in a Synchronization Signal, SS, burst and/or SSB burst set; and
at least some SSBs in the plurality of SSBs in the SS burst and/or SSB burst set are transmitted with different beamforming.

31. The method of claim 30 wherein the duration of the transmission unit does not extend to a next SSB in the SS burst and/or SSB burst set.

32. The method of claim 20 further comprising repeating the steps of receiving and decoding for a plurality of SSBs across a plurality of SS bursts and/or SSB burst sets, where different types of OBI are transmitted in different SS bursts and/or SSB burst sets.

33. The method of claim 20 further comprising receiving information regarding a location of the OBI in the transmission unit.

34. The method of claim 20 wherein the transmission unit comprises a control channel comprising information indicative of a location of the OBI within the transmission unit.

35. The method of claim 20 further comprising receiving information that indicates whether the OBI is collocated with SSBs.

36. The method of claim 20 further comprising receiving information about the OBI being frequency division multiplexed, time division multiplexed, or time and frequency multiplexed with the SSB.

37. The method of claim 20 wherein the duration of the transmission unit is longer than that of the SSB.

38. The method of claim 20 wherein the RMSI is System Information Block 1, SIB1.

39. A wireless communication device for a wireless communication system, the wireless communication device adapted to:
   receive and decode a transmission unit in which Other Broadcast Information, OBI, is collocated with at least a portion of a Synchronization Signal Block, SSB, wherein:
      the transmission unit is a transmission unit having a duration that is two or more symbols but less than a duration of a full slot;
      the SSB comprises a Primary Synchronization Signal, PSS, a Secondary Synchronization Signal, SSS, and a Physical Broadcast Channel, PBCH; and
      the OBI comprises paging messages, Remaining Minimum System Information, RMSI, and/or Random Access Response, RAR, messages.

40. A wireless communication device for a wireless communication system, comprising:
   one or more receivers; and
   circuitry operable to, together with the one or more receivers, receive and decode a transmission unit in which Other Broadcast Information, OBI, is collocated with at least a portion of a Synchronization Signal Block, SSB, wherein:
      the transmission unit is a transmission unit having a duration that is two or more symbols but less than a duration of a full slot;
      the SSB comprises a Primary Synchronization Signal, PSS, a Secondary Synchronization Signal, SSS, and a Physical Broadcast Channel, PBCH; and
      the OBI comprises paging messages, Remaining Minimum System Information, RMSI, and/or Random Access Response, RAR, messages.

\* \* \* \* \*